United States Patent [19]

Wiegand et al.

[11] 4,003,365

[45] Jan. 18, 1977

[54] STRUCTURE FOR COLLECTING SOLAR ENERGY

[75] Inventors: James B. Wiegand, Longmont; John M. Freeman, Jr., Denver, both of Colo.

[73] Assignee: Solar Energy Research Corporation, Denver, Colo.

[22] Filed: Sept. 23, 1974

[21] Appl. No.: 508,527

[52] U.S. Cl. ............................ 126/271; 237/1 A
[51] Int. Cl.² ............................................ F24J 3/02
[58] Field of Search ............ 237/1 A; 126/270, 271; 34/93

[56] References Cited

UNITED STATES PATENTS

| | | | |
|---|---|---|---|
| 3,146,774 | 9/1964 | Yellott | 126/271 |
| 3,159,554 | 12/1964 | Mount | 126/271 |
| 3,336,206 | 8/1967 | Sasaki | 34/93 |
| 3,411,163 | 11/1968 | Myers | 126/271 |
| 3,453,666 | 7/1969 | Hedges | 126/271 |
| 3,620,206 | 11/1971 | Harris | 126/271 |
| 3,894,685 | 7/1975 | Keyes | 126/270 |

FOREIGN PATENTS OR APPLICATIONS 763,867   5/1934   France .............................. 126/271

*Primary Examiner*—Kenneth W. Sprague
*Assistant Examiner*—James C. Yeung
*Attorney, Agent, or Firm*—Van Valkenburgh and Lowe

[57] ABSTRACT

A structure for collecting solar energy and storing the same as heat in a body of water. An inclined southerly wall is provided with a solar absorption surface protected from convection losses by a transparent membrane overlaying the absorption surface. The absorption surface is also formed as a membrane which is wetted at its underside within the structure by water spray and as solar radiation is absorbed and converted to heat at the membrane, the water at the underside of the membrane is heated. This heated water drops from the membrane and flows to a reservoir.

10 Claims, 4 Drawing Figures

U.S. Patent   Jan. 18, 1977   Sheet 1 of 2   4,003,365
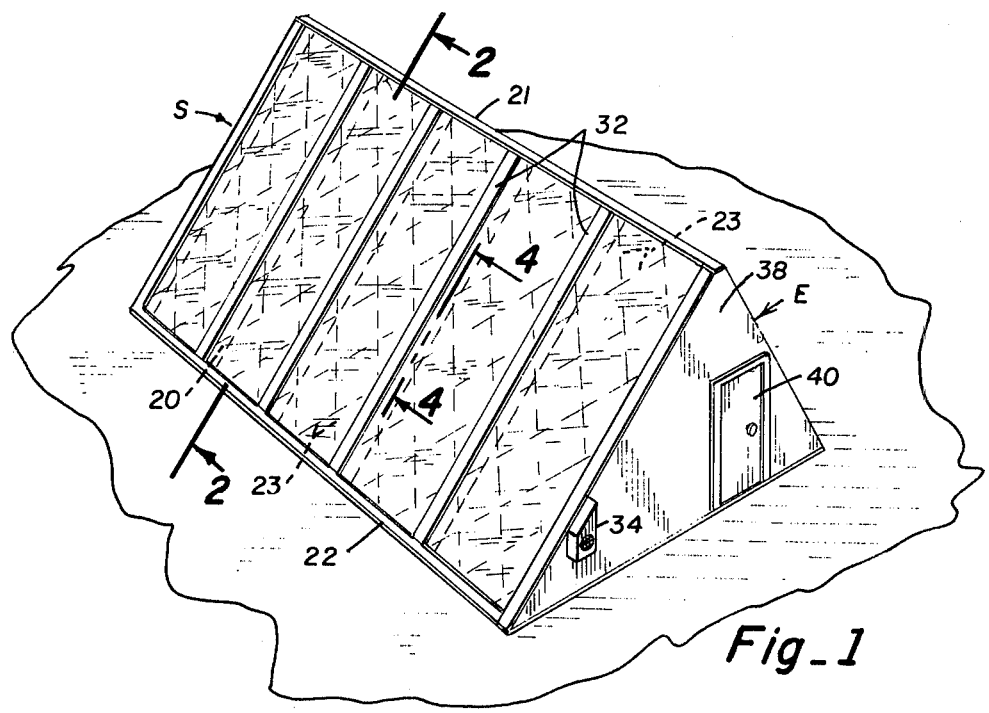
Fig_1
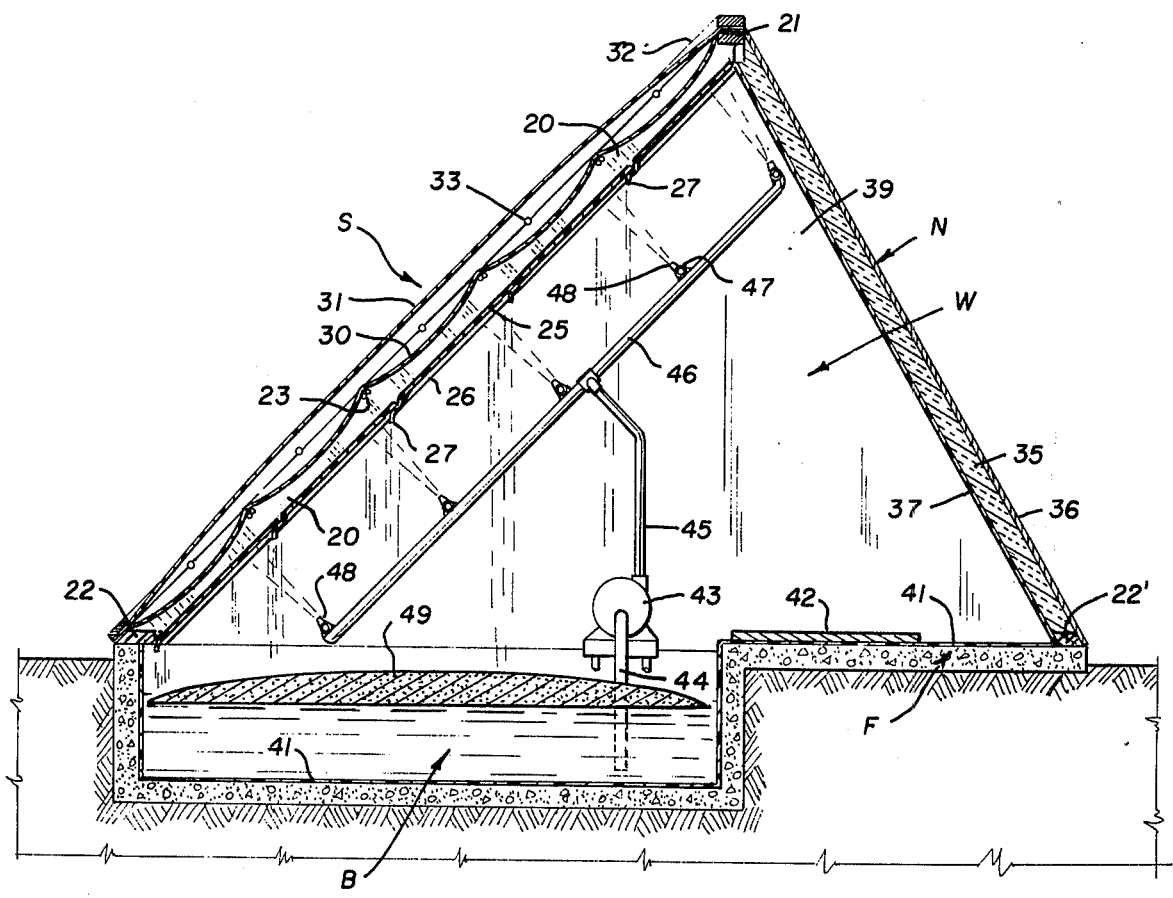
Fig_2

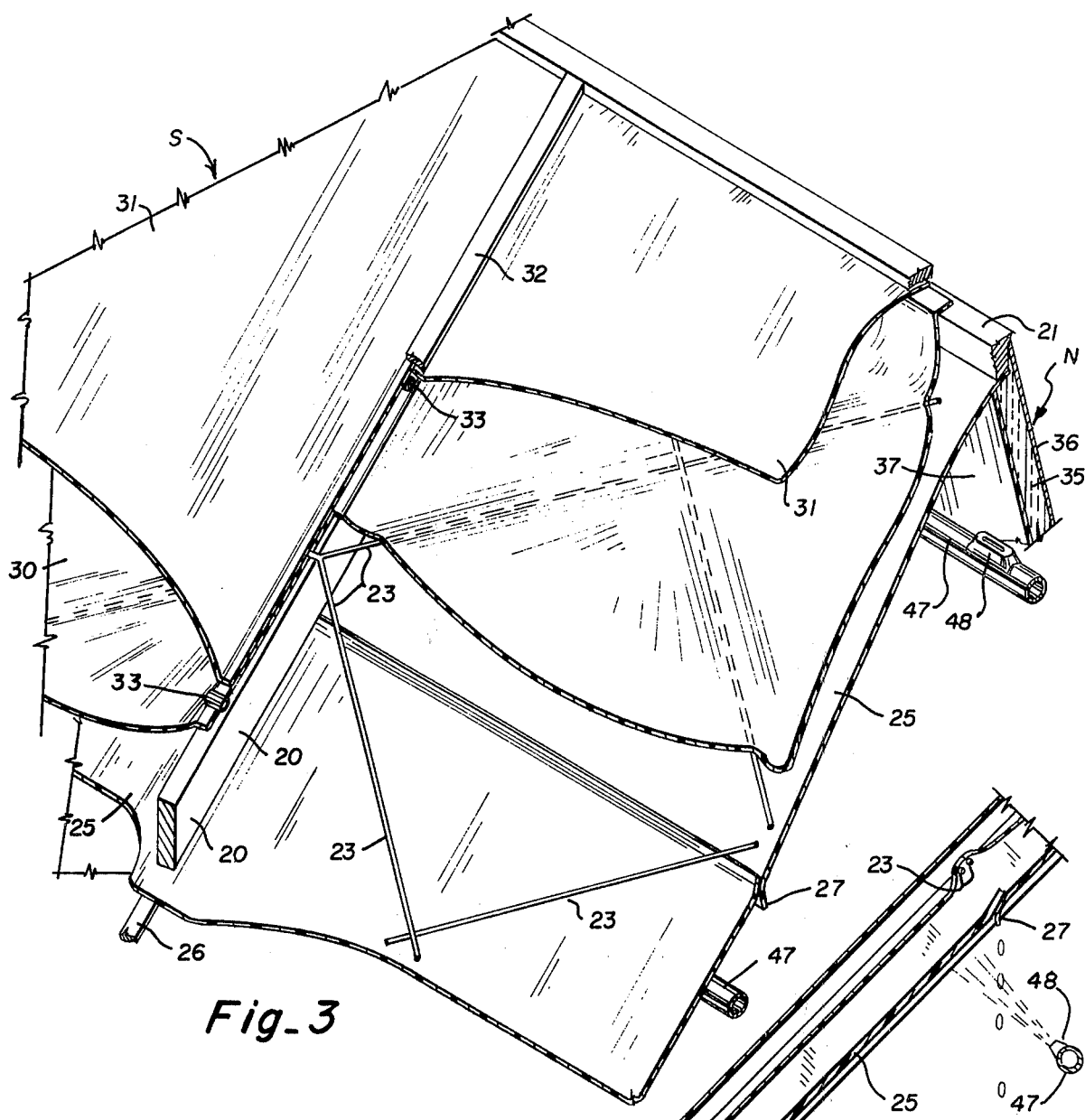
Fig_3
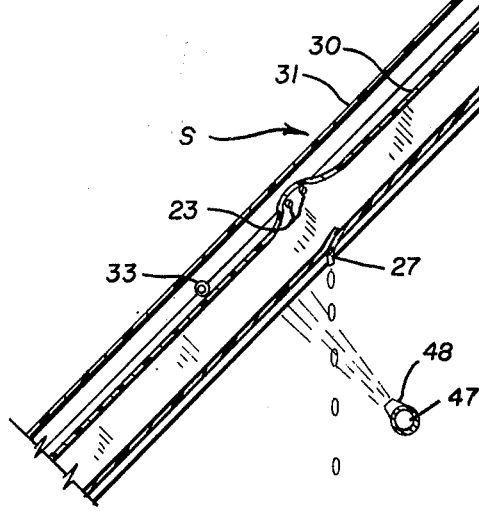
Fig_4

STRUCTURE FOR COLLECTING SOLAR ENERGY

This invention relates to apparatus for collecting and retaining solar energy as heat, and more particularly to apparatus which collects solar energy on an absorption surface and uses water as the heat retention medium. Preferably, the invention will be incorporated into a structure of a permanent nature and thus, it will be called a "structure for collecting solar energy".

A primary object of the invention is to provide a novel and improved structure for collecting solar energy which effectively uses water, or any other suitable liquid, not only to retain the heat generated from the sun's rays, but also to serve as a medium for removing the heat generated at the absorption surface as it receives the sun's rays.

Another object of the invention is to provide a novel and improved structure for collecting solar energy and retaining the same as heat in a body of water, which is adapted to direct water against an energy absorption surface in an effective, efficient and simple manner.

Another object of the invention is to provide, in a novel and improved structure for collecting solar enrgy as heat upon an absorption surface, an arrangement for flowing water over the absorption surface which will minimize the re-radiation losses and permit the operation of collecting the solar energy to proceed in the most efficient manner possible.

Another object of the invention is to provide a novel and improved structure for collecting solar energy which is especially suitable for greenhouses, industrial processes, car washers and the like.

Other objects of the invention are to provide a novel and improved structure for collecting solar energy which is economical, simple and reliable, which can be built from commonly available materials at a minimum of cost, capable of competing with conventional types of heating apparatus; and which can be easily used in conjunction with other structures.

With the foregoing and other objects in view, my invention comprises certain constructions, combinations and arrangements of parts and elements as hereafter described, defined in the appended claims, and illustrated, in preferred embodiment, in the accompanying drawing in which:

FIG. 1 is a perspective view of a solar energy collector structure built according to the principles of the present invention;

FIG. 2 is a transverse section through the collector as from the indicated line 2—2 at FIG. 1;

FIG. 3 is an isometric fragmentary view of a ridge section of the collector with portions of the cover sheet broken away to further exemplify the manner in which the unit is built; and FIG. 4 is a fragmentary sectional detail as taken from the indicated line 4—4 at FIG. 1 but on a further enlarged scale and with the water sprays being diagrammatically indicated to exemplify the operation of the unit.

The threat of a continuing fuel shortage has brought about an extensive development of apparatus designed to collect and use solar energy. One feature of a common type of such apparatus consists in the use of a sheet, or the like, to form a heat absorption surface to receive and absorb the sun's rays. As the temperature on this sheet forming the heat absorption surface rises, the heat is removed by a fluid, either air or water, flowing past the sheet. The fluid, then warmed, may be used directly such as for a hot air or a hot water supply, or such heat energy may be transported and stored as in a tank or in a body of rocks or the like.

Most solar heating systems use air as the fluid for transporting the heat of solar energy although the use of water in such a system for both the transportation and storage of heat energy appears to be more desirable because of the high specific heat capacity of water as compared with air and other materials. However, the use of water has had serious limitations. For example, an important limitation resides in the difficulty of subjecting the sheet forming the heat absorption surface to a uniform flow of water and the difficulty in effectively spreading the water over the entire surface of the sheet. Another limitation resides in the fact that evaporation of water can cause serious heat losses, formation of salt and scale deposits in the apparatus. Also, corrosion can be a problem in such a system.

The present invention was conceived and developed with such and other considerations in view and the invention comprises, in essence, a structure for collecting solar energy having one wall formed as a properly-oriented, inclined solar absorption surface which is protected by transparent membranes of suitable material. The solar absorption surface is an opaque, preferably black, plastic sheet. Solar energy is absorbed at its outer surface. The structure also includes other walls arranged to completely enclose it, with such walls being insulated to minimize heat losses therefrom and waterproofed and vapor-proofed at the inside to prevent the escape of water vapor therefrom. A water flow against the undersurface of the heat absorption sheet, to remove heat from that sheet as fast as the sun's rays generage the heat, is effected by a spray designed to wet all parts of the sheet surface. The water flows from the sheet and into a collector basin at the floor of the structure in a continuous manner and the heated water may be stored in the basin or flowed to a reservoir tank or other facility.

There will be a 100 percent humidity within the structure because of the spray against the absorption sheet and all portions of the walls will be damp while the apparatus is operating. This, however, will create no special problems because of the waterproof and vapor-proof construction and the flow of water to the floor basin will not lose any of the heat collected at the absorption sheet.

It was discovered that this mode of collecting heat was very efficient. Water can be circulated from the bottom of the reservoir, or the bottom of the basin, where the coldest layers of water will be found, and this colder water will be sprayed against the absorption sheet to hold the absorption sheet at a minimum possible temperature while it is imparting solar-generated heat to the water. This results in a minimum of re-radiation of energy from the absorption sheet since the losses of heat from the absorption sheet, as by re-radiation, are related to the temperature of the sheet itself. Also, the spray action against the underside of the sheet can be controlled to permit the water to fall away from the sheet as droplets as the water temperature increases and no portion of the water will remain upon the sheet for an excessive length of time. A natural decrease in viscosity of water as it is heated will assist in this action. It is to be noted that the water used for this purpose may include a detergent or similar wetting agent to better wet the underside of the absorption sheet and that, if desired, this water may also include other additives such as an anticorrosion agent. Also, whenever the absorption sheet is of a type which permits infra-red radiation to pass through it and into the structure, the droplets will absorb the energy of such radiation.

Another advantage in the collection of heat by the spray action resides in the fact that droplets of water produced by the spray action which do not strike the absorption sheet but which fall through the air as a mist or rain, will absorb heat from the air within the structure to impart heat to the water in the base. Thus, should portions of the surface of the absorption sheet not be effectively wetted by the spray, the air within the structure will nevertheless pick up heat from such sections of the absorption surface by convection which, in turn, is absorbed by the droplets of water falling to the basin within the structure.

To further set forth the features and advantages of the invention, reference is made to the drawings which exemplify a preferred embodiment thereof. As shown at FIG. 1, the primary feature of the structure is the solar wall S which is designed and oriented to receive the sun's rays. As such, this solar wall is preferably rectangular in form, oriented in a general east-west direction to face the sun from the south, and inclined from the vertical at an angle which is selected to lie normal or approximately normal to the sun's rays whenever the sun is at a specific altitude. This will depend upon the latitude where the structure is to be located and a specific time of year, such as at the winter soltice. A skilled surveyor or other artisan can select a proper inclination for any selected location and condition. This inclination of the solar wall S from the vertical all will vary throughout the country and will be from 20° to 50° in latitudes encompassing the continental United States. Actually, it is not essential; in fact, it is impossible, to position the solar wall S such that it is always normal to the sun's rays. However, a suitable absorptive surface can absorb the sun's rays even when the absorption sheet is inclined from the normal, although there will be a reduction in the effective area which receives the sun's rays. Thus, the flat, inclined solar wall S mounted in a fixed position, facing south, can receive the sun's rays for a substantial portion of a day even though its efficiency decreases when the sun's position is in the east or west portion of the sky.

With the inclined solar wall S, a natural form of the structure is tent-like, with a complementary sloping north wall N opposite the solar wall S and triangular end walls E and W at the east and west ends of the building to complete the enclosure. It is to be noted, however, that the north wall need not have the same slope as the solar wall S, nor for that matter, the structure need not be tent-shaped, as illustrated, providing that the structure is enclosed. Thus, this structure may be a rectangular, box-like unit or in any other suitable form, the tent-shape being preferred only because of an economy of material and a natural, structural rigidity. The structure may also be a portion or an annex to an existing building where such is suitable for the purpose at hand. The structure is completed by a floor section F which includes a basin B and it is to be noted that the north wall, end walls and the floor F are not only rendered vapor-proof, but they are also insulated to prevent heat loss as hereinafter described.

In this preferred embodiment, the solar wall S is formed between the end walls E and W by an array of spaced-apart rafters 20 inclined from a ridge 21 to a sill 22 at the base of the wall. Thus, solar energy absorption panels are formed between the end walls and adjacent rafters 20 and between other rafters 20 as illustrated. It is contemplated that each end wall E and W will also have a corresponding rafter-like member, not shown, such as a rafter 20 at its inner face to facilitate attachment of components thereto as will be hereinafter described. Each rafter 20, which may be a structural 2 × 4 or similar beam, is stabilized laterally by a diagonal network of wires 23 extended across each panel in a regular array, the wires being fastened to the top surface of each rafter and also the top edges of the end walls E and W in any suitable manner.

The energy absorption sheeet 25 is extended across each panel between the rafters 20 and this sheet 25 is preferably black colored and of a plastic material such as polyethylene. A black, high density polyethylene sheet 0.004-inches thick was found to be suitable for the purpose and such material is easily available. Such a sheet has not heretofore been considered entirely suitable because it will not completely absorb infra red radiation but in the present invention, radiation into the structure will be absorbed by a spray of water as previously mentioned. This absorption sheet 25 is stretched and mounted in place by being fastened to the underside of each rafter and a single sheet may be stretched across the entire reach of the solar wall S from one end wall to the other. A slat 26 may be used at the underside of each rafter 20 and the rafter-like members at the end walk help hold the sheet in place. Some wrinkling of the sheet is inevitable when the sheet is fastened in place even with the slats helping to hold the sheet. Once in place, however, a natural shrinking of the sheet will occur to stretch it taut.

Where the structure is of appreciable size, such as where the rafters 20 are 20-feet high, a single polyethylene sheet sufficiently wide to overlay the rafters cannot be obtained and 4 foot webs of the sheeting may be lap welded together to form the sheet 25. In doing so, it becomes desirable to orient the lapped edges horizontally with a downturned lip 27 at each joint to facilitate the removal of water from the sheet by dripping, as illustrated at FIGS. 3 and 4.

The energy absorption sheet 25 must be protected from the exterior air to prevent heat from being removed by convection currents and a cover is provided by two layers 30 and 31 of sheets of clear polyethylene or a like resin which is quite transparent to the sun's rays, especially the rays in the infra-red range. The two layers are attached to the top edge of each rafter and the top edges of the end walls to space them away from the absorption sheet 25 and they are held in place by slats 32 upon the rafters and upon the end walls. One or more thimbles 33 are provided at each rafter, between the layers 30 and 31 to provide air communication between the layers to hold them in place as will be described. The manner in which the two layers 30 and 31 are attached to the top edge of each rafter may be varied somewhat depending upon the construction procedures being used. For example, a slat, not shown, similar to slats 32, may be located between the layers 30 and 31 so that the layer 30 may be placed before the layer 31 is placed above the layer 30. With this arrangement, the thimbles 33 would not be necessary since a gap in the spacer slat could provide the same function of communication permitting airflow between the sheets from one panel to another.

It is to be noted that the lower layer 30 rests upon the diagonal wire network 23 and the spacing of the wires is such as to hold this layer above, and out of contact with, the absorption sheet 25 whenever the sheet is bellowed downwardly by air pressure between the sheets as now described.

The use of one heat transmission as a cover is possible but the two sheets 30 and 31 more effectively insulate the solar wall S from heat loss from absorption sheet 25. To provide an effective insulation, these transmission sheets 30 and 31 are held apart by air pressure to provide an air gap between them. Also, another air gap exists between the lower sheet 30 and the absorption sheet 25 since the lower sheet 30 is prevented from touching the absorption sheet 25 by the wire network 23. A small air pump 34 is mounted on a side wall E of the structure which has a discharge passage which communicates with the space between the heat transmission sheets 30 and 31 to blow air into the panels to spread the sheets apart. This airflow from one panel to the next will be through the thimbles 33. Although the sheets 30 and 31 will be stretched fairly tightly over each of the several panels, they will billow apart responsive to a very small air pressure, as in the manner best shown at FIGS. 2 and 3. The air pressure may be less than 1 pound per square foot. When the sheets 30 and 31 are so spread by air pressure between the layers, the structure is ready for use as a solar energy collector.

The remainder of the structure, the north wall and the triangular east and west walls, and the floor section may be built in a conventional manner, providing that the same are rendered waterproof and vapor-proof and are well insulated. Preferably, the north wall N may be sloped oppositely to the slope of the solar wall S as illustrated, although as heretofore mentioned, this is not essential. The north wall may be formed of rafters, not shown, extending from the ridge 21 to a sill plate 22' and the space between the rafters will be carefully insulated as by insulation 35. Also, it is essential to provide a roof cover sheet 36 at the outer side of this north wall for weather protection. An impermeable inner sheet 37 is provided at the inner side of this wall which is both waterproof and is a vapor barrier. This waterproofed vapor barrier is necessary because the structure must withstand high humidity and excessive moisture which will occur within the structure when it is in operation as will be described. A number of commercial companies provide waterproof plastic and asphalt sheets which are also effective vapor barriers.

The end walls E and W may be built in a similar manner using vertical studs, not shown, with insulation between the studs. The outer wall 38, indicated at FIG. 1, is a conventional weatherproofed wall, and the inner wall 39, indicated at FIG. 2, is vaporproof, the same as the cover sheet 37 heretofore described. Also, as illustrated at FIG. 1, a suitable doorway and door 40 may be provided in one of these vertical walls such as a wall E, for access to the interior of the structure.

The floor F is likewise built in essentially a conventional manner. It is preferably made of reinforced concrete to provide structural strength sufficient for the basin B to be filled with water. The concrete may be of an insulating type, but if not, an insulating layer, not shown, may be extended above, or underneath, the floor F and the basin B to prevent heat loss into the ground. Also, it is essential that this floor F and basin B be waterproofed and vapor-proofed the same as the north wall and end walls of the structure. A vapor barrier sheet 41 will extend over the entire floor and basin structure, as illustrated at FIG. 2 and join with the other vapor barrier sheets 37 and 39 and with the absorption sheet 25. The basin B will be over the sloping solar wall 25 and a walkway 42 may be provided at the north side of this basin, at the floor section under the north wall N.

This structure for collecting solar energy is completed by providing a suitable spray system adapted to direct sprays of water against the heat absorption sheet 25. In the arrangement best illustrated at FIG. 2, a water pump 43 at one end of the structure has its intake 44 at the bottom of the basin and the discharge line 45 extends upwardly therefrom to a manifold 46 which, in turn, connects with an array of spray pipes 47 extending in spaced parallelism longitudinally across the structure behind the solar wall S the length of the building. Each distributing pipe 47 is equipped with an array of nozzles 48 as illustrated at FIGS. 2 and 3, the nozzles 47 being spaced along the pipes 46 so as to direct a fine spray of water against the underside of the absorption sheet 25. As illustrated at FIG. 2, the distributing pipes and the nozzles are arranged to wet the underside of this absorption sheet over its entire area. Preferably, the distributing pipes 46 are spaced from top to the bottom of the structure in a pattern which corresponds with the seam lips 27 so that the water directed to the underside of each end portion of the sheet will run off at the seam lip 27 after it flows down the sheet and across the web portion forming the seam lip 27. The direction of the spray is illustrated in the drawings as being normal to the absorption sheet 25. However, it is to be noted that this spray could be directed at an angle with respect to the absorption sheet and the spraying could be horizontal or even vertical providing it strikes the absorption sheet to keep the sheet wet.

As the water drips from the heat absorption sheet, it will fall into the basin B. An insulating cover float 49 may be placed in this basin to help reduce heat loss from the stored water when the structure is not in operation, such as at nighttime. The insulating cover float 49 is preferably made of expanded, polystyrene foam or polyurethane closed-pore foam or such materials that are very light in weight and have excellent insulating properties. The portions of the cover sheet, or sheets, is such that the basin is substantially covered, excepting for edge portions to permit water to flow from the upper surface of the cover sheet to the basin and the upper surface of the cover sheet is sloped in any suitable manner to facilitate such flow.

It is to be noted that in the operation of this apparatus, the spray within the structure will cause essentially a fog of water and a considerable amount of water and spray will be directed against the underside of the absorption sheet 25. Thus, with sunshine, this water will be continually heated by removing heat from the absorption sheet. For a most effective operation, the base of the intake 44 of the pump 43 will be near the bottom of the basin B where the water will be cooler because of the greater density of the cool water. As the water flows down the absorption sheet, it is heated and falls, as droplets, into the basin B. Thus, the warmer water will be near the top of the basin. As this water is warmed up, it may be utilized in a number of ways. The water from the basin B may be piped to another structure or to a storage tank by distributing lines from the basin which are not shown. The warmed water may even be permanently removed from the basin. In any event, an outlet conduit from the basin will be located near the upper level of the basin to take the water as it is warmed by solar action. Such an outlet conduit can be attached to the floating cover in order to be located at the warmest portion of the tank water, regardless of the possibility of the water level varying within the tank. It is to be noted that the high humidity and fog of water within the structure will not detract from the effectiveness of the operation of the apparatus so long as the structure is enclosed and vapor-proofed since, then heat loss by evaporation will not be a factor in the operation of the structure.

From the foregoing description, it is apparent that this structure can be constructed as a large building capable of collecting a large quantity of solar energy, capable of heating commercial installations. Also, the structure may be used at the top of commercial buildings for heating the building. To demonstrate the effectiveness of the moderately sized unit, a structure for collecting solar energy was built having a solar wall S 19½ feet high and 95½ feet long with an effective area of about 1850 square feet. A charge of 2,000 gallons of water at a temperature of 59.5° F. was warmed to a temperature of 112.5° F. in a short period of time and it was estimated that the heat collected was 886,120 (British thermal units) BTU. In another test using 6,162 gallons of water, the water was heated from 75° F. to 95° F. in a short period of time and it was estimated that 1,029,820 BTU of heat were collected in the day's run. Clearly, the structure can operate effectively and it can be used to heat the various structures such as buildings. It appears that the apparatus is especially adapted for use with greenhouse structures which must be heated during the winter months in many portions of the country.

The efficiency of the unit is further enhanced by the droplets of water falling through the air within the structure. The air within the structure will be heated by the absorption membrane, especially at portions where the spray may not effectively strike it. Likewise, some droplets of water from the spray will not strike and wet the membrane but will form a mist or fog in the structure before falling into the basin. Such droplets will absorb heat from the air within the structure to enter the basin at an increased temperature along with water dropping from the absorption membrane.

While we have now described our invention in considerable detail, it is obvious that others skilled in the art can build and devise alternate and equivalent constructions which are nevertheless within the spirit and scope of our invention. Hence, we desire that our protection be limited not by the constructions illustrated and described, but only by the proper scope of the appended claims.

What is claimed is:
1. Apparatus for collecting solar energy to heat a liquid, said apparatus comprising, in combination:
   a. an enclosed structure having a solar wall angled upwardly from the horizontal at one side of the structure at an inclination exceeding 20° and oriented to receive solar energy;
   b. a solar energy transmission sheet forming the outer face of the solar wall;
   c. a solar energy absorbing sheet forming the inner face of the solar wall and being spaced from the transmission sheet a distance sufficient to provide an insulting air space between the sheets, with the outward surface of the solar energy absorbing sheet facing the transmission sheet to receive and absorb solar energy transmitted therethrough and to be heated thereby and with the inward surface of the solar energy absorbing sheet facing the interior of the structure;
   d. a pressurized liquid distribution system within the structure, including nozzles spaced from the solar wall and oriented to spray liquid across the space within the structure against substantially the entire inward surface of the solar energy absorbing sheet to wet this surface and thereby effect a transfer of heat from the solar energy absorbing sheet to the liquid sprayed thereon; and
   e. a liquid reception basin within the structure below the heat absorption wall to receive liquid flowing from and off the solar energy absorbing sheet.

2. The structure defined in claim 1, wherein:
a wall opposing the solar wall is correspondingly inclined in the opposite direction to provide a tent-shaped building.

3. The apparatus defined in claim 1, including:
a heat transmission membrane overlies the aforesaid heat absorption membrane whereby to minimize heat losses from air convection currents above the heat absorption membrane.

4. The structure defined in claim 1, wherein:
the solar wall is formed as a series of panels between horizontal and upright structural beam members with said solar energy absorbing sheet being at the under edge of such beam members, and said solar energy transmission sheet being at the outer edge of the beam members to space the sheets apart.

5. The apparatus structure defined in claim 1, wherein:
said solar energy transmission sheet comprises a pair of membranes and
a blower means to flow air between the two membranes to hold them apart.

6. The apparatus defined in claim 5, including:
a wire grid between panels adapted to stabilize the same and to support a heat transmission membrane.

7. The structure defined in claim 1, wherein:
the solar energy absorbing sheet includes an array of horizontally extended lips at its inner side to facilitate dropping liquid off the sheet as it flows down the inclined sheet.

8. The structure defined in claim 1, wherein:
an insulated float lies over the liquid reception basin to keep the liquid therein warm when the collector is not generating heat.

9. The structure defined in claim 1, wherein: the liquid distribution system includes horizontally disposed pipes with spaced nozzles to direct a horizontal spray of liquid against the sloping inner side of said membrane.

10. The structure defined in claim 1, wherein:
said membrane is formed as a flexible sheet of a thermoplastic type resin.

* * * * *